No. 828,252. PATENTED AUG. 7, 1906.
W. B. SPEAR.
MITER BOX.
APPLICATION FILED JULY 18, 1905.
2 SHEETS—SHEET 2.
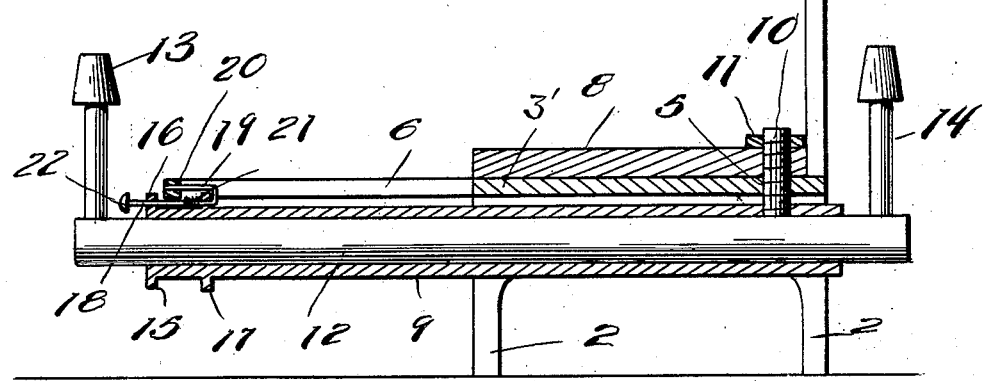
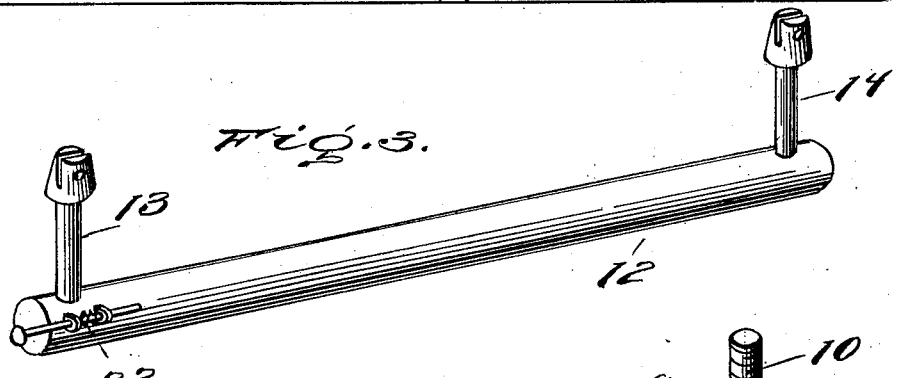
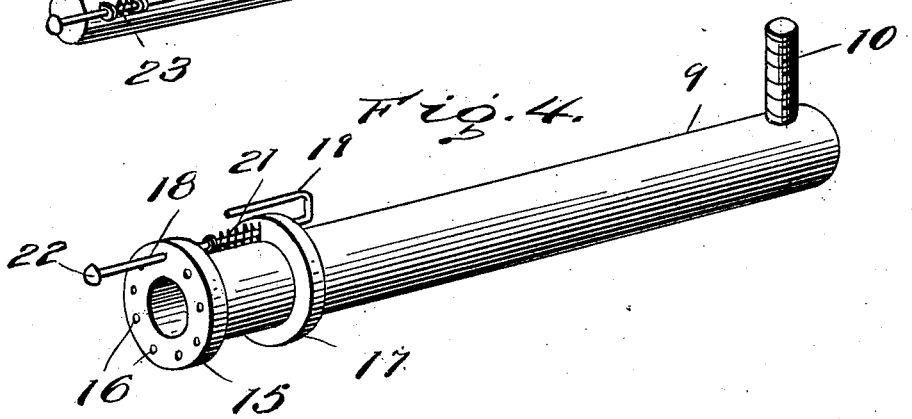
Witnesses
C. R. Thomas
E. M. Colford
Inventor
W. B. Spear
By Chandler & Chandler
Attorneys

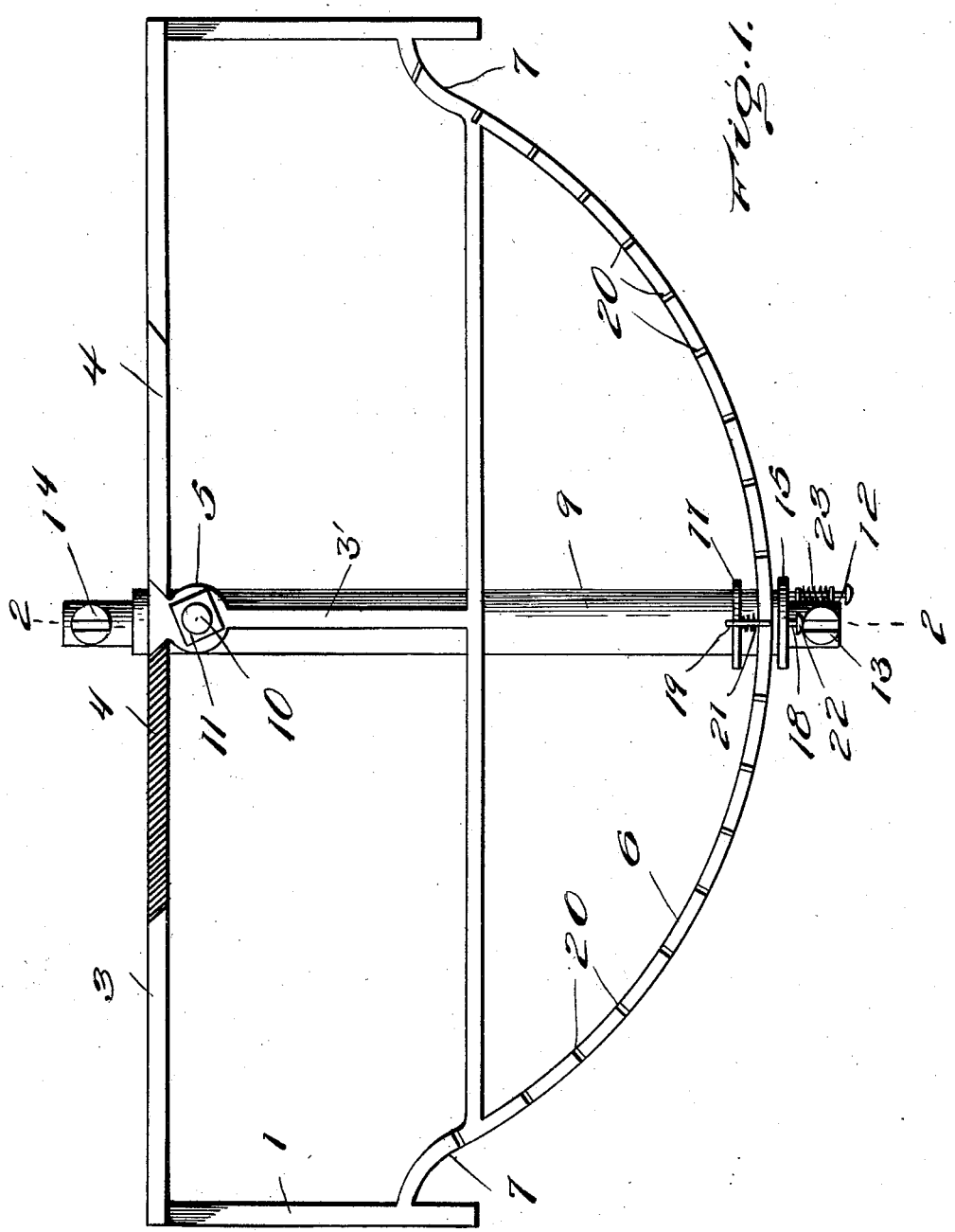

UNITED STATES PATENT OFFICE.

WILLIAM B. SPEAR, OF STEWART, OHIO.

MITER-BOX.

No. 828,252.   Specification of Letters Patent.   Patented Aug. 7, 1906.

Application filed July 18, 1905. Serial No. 270,279.

*To all whom it may concern:*

Be it known that I, WILLIAM B. SPEAR, a citizen of the United States, residing at Stewart, in the county of Athens, State of Ohio, have invented certain new and useful Improvements in Miter-Boxes; and I do hereby declare the following to be a full, clear, and exact description of the invention, such as will enable others skilled in the art to which it appertains to make and use the same.

This invention relates to miter-boxes, and has for its object to provide a novel mounting of the saw-guide so as to effect convenient adjustment thereof to various angles and to provide for locking the saw-guide against looseness when set to any predetermined angle.

A further object of the invention is to provide for adjustably tilting the saw-guide to the vertical and to conveniently lock the same when it is adjusted.

With these and other objects in view the present invention consists in the combination and arrangement of parts, as will be hereinafter more fully described, shown in the accompanying drawings, and more particularly pointed out in the appended claim, it being understood that changes in the form, proportion, size, and minor details may be made within the scope of the claim, without departing from the spirit or sacrificing any of the advantages of the present invention.

In the drawings, Figure 1 is a plan view of the miter-box embodying the features of the present invention. Fig. 2 is a cross-sectional view on the line 2 2 of Fig. 1. Fig. 3 is a detail view of the saw-guide, and Fig. 4 is a detail view of the carrier for the saw-guide.

Like characters of reference indicate corresponding parts in each and every figure of the drawings.

The present device includes a base 1 of suitable proportions—say twenty inches long and six inches wide—and is supported at its four corners by means of any proper form of legs 2. At the rear edge of this space there rises a back 3, which is cut away or open, as at 4, at the middle thereof. Midway between the ends of the base is formed the center crossbar 3', in which adjacent the rear end thereof there is an opening 5, and at the front edge of the base there is an arcuate gage-bar 6, which is struck from the opening 5 as a center. The ends of this gage-bar extend into the base at suitable intervals from the ends of the latter, and between the adjacent ends of the base and the gage-bar the front of the base is provided with notches or openings 7, constituting seats for a purpose as will be hereinafter described. The base 1 may be a solid metal plate or it may be a skeleton formation; but in any event a wooden platform 8 is placed upon the top of the base to form a bed against which the teeth of the saw may engage to prevent injury thereto.

The saw-guide of the present invention includes an open-ended tubular carrier 9, which lies beneath the base and is of a length to project at the rear thereof and also in front of the gage-bar 6. Adjacent the rear end of the carrier there rises a post 10, which is rotatably received within the opening 5 and is held therein by means of a removable head or nut 11, fitted to the upper end of the post and lying upon the top of the base. Within this carrier there is a bar 12, which projects beyond opposite ends of the carrier, and from its projected ends rise alined saw-guide posts 13 and 14, which are screwed into or otherwise secured to the bar after the latter has been introduced into the carrier. These guide-posts may be of any common or preferred construction, the one essential being that they are longitudinally bifurcated to receive the saw-blade in the well-known manner.

At the forward extremity of the carrier 9 there is an external annular flange 15, which is disposed in front of the gage-bar 6 and is provided with an annular series of perforations 16. Inwardly from the flange 15 there is another annular flange 17, lying adjacent to and overlapping the inner or rear face of the gage-bar 6. An endwise-movable latch-bar 18 works through corresponding perforations in the flanges 15 and 17 and is provided at its inner or rear end with a rebent or hooked terminal 19, which is designed to engage with any one of a series of notches or seats 20 in the gage-bar 6 and disposed at predetermined angles with respect to the opening 5 as a center. The latch-bar 18 is yieldably held at its outer limit by a coil-spring 21, embracing the bar to which it is connected at its outer end with its other end bearing against the flange 17. A suitable handle 22 is provided upon the outer end of the latch-bar for convenience in pushing the latter inwardly to disengage the latch-terminal 19 from the gage-bar 6.

The bar 12, which connects the guide-posts 13 and 14, is capable of being adjustably rotated within the carrier 9, so as to give the saw-blade an angular adjustment with respect to the vertical. It is proposed to lock the bar 12 by means of a spring-actuated latch-bar 23, carried by the front projected end of the bar for individual engagement with the perforations 16 in the flange 15.

In using the present device, the latch-bar 18 is disengaged from the gage-bar 6 and the saw-blade swung upon the post 10 as a center to any predetermined angle which is suitably indicated upon the gage-bar 6, whereupon the terminal 19 of the latch-bar is engaged with the adjacent seat or notch 20 of the gage-bar to hold the saw-guide in its adjusted position. The work is then placed upon the base and against the back 3 and the saw-blade engaged with the guide-posts 13 and 14 in the usual manner, the opening 4 in the back accommodating the portion of the saw-blade which projects in rear of the device. Should it be desired to give the saw-blade an adjustment at an angle to the vertical, the latch-bar 23 is withdrawn from the flange 15 and the bar 12 rotated to bring the latch 23 into position for engagement with a predetermined perforation in the flange 15, whereupon the latch is reëngaged with the flange, and the guide-posts are thereby locked in a position at an angle to the vertical.

It will here be explained that the seats or notches 7 in the opposite end portions of the front edge of the base are designed to accommodate the front guide-post 14 when the saw-guide is swung to either of its limits.

What is claimed is—

In a miter-box, the combination with a base having an opening therein, an arcuate gage-bar struck up from said base and disposed concentrically with respect to said opening, a tubular carrier located beneath the base, and provided with an upstanding post pivotally supported within the opening, the front end portion of the carrier being provided with spaced annular flanges working on opposite sides of the gage-bar, a latch-bar working through openings in the flanges and provided with a rebent inner terminal working through the inner flange for adjustable engagement with the gage-bar, a bar rotatably adjustable within the carrier and projecting beyond the ends thereof, saw-guide posts rising from the projecting end portion of the rotatable bar and a latch member carried by the front of the rotatable bar for adjustable engagement with the front flange of the carrier.

In testimony whereof I affix my signature in presence of two witnesses.

WILLIAM B. SPEAR.

Witnesses:
ADELINE H. BREWER,
S. T. HULL.